United States Patent
Bittner et al.

(10) Patent No.: US 10,054,225 B2
(45) Date of Patent: Aug. 21, 2018

(54) SELF-PROPELLED OFF-ROAD AGRICULTURAL VEHICLE WITH A DYNAMICALLY RECONFIGURING SPEED CONTROL AND DISPLAY SYSTEM

(71) Applicant: CNH Industrial America LLC, New Holland, PA (US)

(72) Inventors: Roy A. Bittner, Cato, WI (US); Nathan Paul Brooks, Manitowoc, WI (US)

(73) Assignee: CNH Industrial America LLC, New Holland, PA (US)

( * ) Notice: Subject to any disclaimer, the term of this patent is extended or adjusted under 35 U.S.C. 154(b) by 180 days.

(21) Appl. No.: 15/082,620

(22) Filed: Mar. 28, 2016

(65) Prior Publication Data
US 2016/0319935 A1 Nov. 3, 2016

Related U.S. Application Data

(60) Provisional application No. 62/154,820, filed on Apr. 30, 2015.

(51) Int. Cl.
*F16H 63/42* (2006.01)
*B60K 35/00* (2006.01)
(Continued)

(52) U.S. Cl.
CPC ............. *F16H 63/42* (2013.01); *B60K 35/00* (2013.01); *F16H 59/12* (2013.01); *A01B 76/00* (2013.01);
(Continued)

(58) Field of Classification Search
CPC .. F16H 2059/0221; F16H 59/12; F16H 63/42; F16H 2063/423; A01B 76/00; B60K 2350/1072
See application file for complete search history.

(56) References Cited

U.S. PATENT DOCUMENTS 6,067,492 A 5/2000 Tabata et al.
6,133,852 A 10/2000 Tonkin
(Continued)

FOREIGN PATENT DOCUMENTS

EP 2336603 A 6/2011

OTHER PUBLICATIONS

Elsuke Miura et al.; "Graphics Display Controller for Automotive Applications." Fujitsu Sci. Tech. J 49, No. 1 (2013): 23-28. US.

*Primary Examiner* — Edwin A Young
(74) *Attorney, Agent, or Firm* — Rebecca L. Henkel; Rickard K. DeMille

(57) ABSTRACT

A self-propelled off-road agricultural vehicle with a dynamically reconfiguring speed control and display system is provided that allows for on-the-go range selection and range modification, without having to release a joystick control and while providing range and speed information on an animated or dynamically reconfiguring speedometer. The system may include an animated speedometer that automatically reconfigures to shown visually change in a manner that shows changed range characteristics including different ranges and different range maximum speeds. This may include changing color of a sweep portion of a dynamic scale of the animated speedometer. The system may allow dual speed change capability configured to allow an operator to change the limits of the speed ranges through either a touchscreen such as an HMI (human machine interface) or control buttons of a grip of a joystick.

20 Claims, 5 Drawing Sheets

(51) Int. Cl.
*F16H 59/12* (2006.01)
*A01C 23/00* (2006.01)
*F16H 59/02* (2006.01)
*A01B 76/00* (2006.01)

(52) U.S. Cl.
CPC ...... *A01C 23/00* (2013.01); *B60K 2350/1072* (2013.01); *B60Y 2200/224* (2013.01); *F16H 2059/0221* (2013.01); *F16H 2063/423* (2013.01)

(56) References Cited

U.S. PATENT DOCUMENTS

| | | | |
|---|---|---|---|
| 6,658,344 B2 | 12/2003 | Hirasago | |
| 6,781,512 B2 | 8/2004 | Hayashi et al. | |
| 7,563,199 B2 | 7/2009 | Ringer | |
| 7,706,954 B2 | 4/2010 | Michi et al. | |
| 7,831,349 B2 | 11/2010 | Jeong | |
| 7,872,570 B2 | 1/2011 | Havins | |
| 7,891,266 B2 | 2/2011 | Kamimura et al. | |
| 2008/0211652 A1 | 9/2008 | Richard et al. | |
| 2009/0171544 A1* | 7/2009 | Tanaka | F16H 59/0204 701/55 |
| 2009/0240396 A1 | 9/2009 | Sullivan | |
| 2011/0043348 A1 | 2/2011 | Blackard et al. | |
| 2013/0135091 A1* | 5/2013 | Platt | B60K 35/00 340/439 |
| 2014/0118133 A1 | 5/2014 | Oba | |
| 2014/0121956 A1 | 5/2014 | Jastrzebski | |
| 2014/0172224 A1 | 6/2014 | Matthews et al. | |
| 2014/0277835 A1 | 9/2014 | Filev et al. | |
| 2014/0336884 A1 | 11/2014 | Roder et al. | |
| 2014/0378274 A1 | 12/2014 | Umemoto et al. | |
| 2015/0015376 A1 | 1/2015 | Jenkins | |
| 2015/0083035 A1* | 3/2015 | Paszkowicz | G08G 1/09623 116/62.3 |

* cited by examiner

SELF-PROPELLED OFF-ROAD AGRICULTURAL VEHICLE WITH A DYNAMICALLY RECONFIGURING SPEED CONTROL AND DISPLAY SYSTEM

CROSS REFERENCE TO RELATED APPLICATIONS

This is a non-provisional application based upon U.S. provisional patent application Ser. No. 62/154,820, entitled "Self-propelled Off-road Agricultural Vehicle with a Dynamically Reconfiguring Speed Control and Display System," filed Apr. 30, 2015, which is incorporated herein by reference.

FIELD OF THE INVENTION

The invention relates generally to speed control systems of self-propelled off-road agricultural vehicles such as self-propelled sprayers and, in particular, to a speed control and display system with a dynamically reconfiguring speedometer.

BACKGROUND OF THE INVENTION

Self-propelled agricultural vehicles, including product application equipment such as self-propelled sprayers, are getting larger to increase operating efficiency by covering more area in a single application pass of a spraying session. The larger self-propelled sprayers are also getting faster to increase operating efficiency by taking less time per application pass and to take less time traveling on the road when transporting between spraying sessions. Even though the larger self-propelled sprayers can travel at relatively fast speeds such as about 30 mph (miles per hour), in some situations like parking or attaching a quick-attach accessory, it is desirable to operate the self-propelled sprayers at relatively slow speed such as less that about 5 mph. However, fixed predetermined ranges typically try to compromise between very slow creeper gear ranges which may not be responsive enough in throttle or drive command response for many situations and very fast highway gear ranges which may be too responsive in throttle or drive command response for many other situations. This may require, for example, a manufacturer to guess what fixed ratios may be most likely desired by a majority of its customers, which may be difficult.

SUMMARY OF THE INVENTION

A self-propelled off-road agricultural vehicle with a dynamically reconfiguring speed control and display system is provided that allows for on-the-go range selection and range modification, without having to release a joystick control and while providing range and speed information on an animated or dynamically reconfiguring speedometer. The "joystick" may provide a combination of grip with buttons, a ground speed control lever to which the grip may be mounted, and a 'gate' or particularly shaped slot which may confine movement of the lever to a meaningful pattern.

To provide fine control at low speeds, while still providing a means of going fast, multiple formulas of (or different equations relating to) lever position to vehicle speed may be provided. These present themselves to the operator very similar to the different gear ratios of a manual transmission. We call them ranges. 100% lever position might result in only 5 mph in "low" range, but result in 30 mph in "high."

Adjustable ratios may allow each operator to choose their preference. Accordingly, this this new information (more adjustment parameters) may be provided to allow resetting of values by an operator, in an intuitive and uncluttered manner using existing visual and tactile format.

According to another aspect of the invention, the dynamically reconfiguring speed control and display system allow for changing between low resolution and high resolution speed control, while permitting real time modification of the speed resolution of the controls, even when on-the-go. Changing between different speed ranges, adjusting maximum speed limit values for the currently-used speed range and reprogramming ranges can be done through joystick controls, whereby an operator need not let go of the joystick to fully control range and speed operational characteristics of a drivetrain system, which may be a hydrostatic drivetrain system.

According to one aspect of the invention, an animated speedometer displays current speed and range limits of currently-defined ranges. The animated speedometer may include a speed scale with segments that change color at the respective segments to show the current range and its corresponding maximum speed as a sweep segment that can be swept through by a speedometer needle. The speed control and display system may have dual speed change capability configured to allow an operator to change the limits of the speed ranges through either a touchscreen such as an HMI (human machine interface) or control buttons of a grip of a joystick.

According to another aspect the invention, a self-propelled off-road agricultural vehicle is provided with a dynamically reconfiguring speed control and display system. The self-propelled off-road agricultural vehicle may include a chassis having wheels for moving the off-road self-propelled agricultural vehicle and planetary gear sets arranged for rotating the wheels. A drivetrain system variably delivers power to the wheels for varying speed of the self-propelled off-road agricultural vehicle. The drivetrain system may be a hydrostatic drivetrain system or other infinitely variable power transmission, including CVT's (continuously variable transmissions) and variable speed belt drives. A speed control and display system is configured for controlling the hydrostatic drivetrain system to provide multiple speed ranges and corresponding different speed control resolutions. Each of the speed ranges defines a range maximum speed corresponding to a maximum travel speed of the self-propelled off-road agricultural vehicle for the respective speed range when the respective speed range is the active speed range. The speed control and display system displays corresponding speed information for viewing by an operator and includes an operator control interface system configured for changing a characteristic of the active speed range to define an updated speed range. A display is configured to change visually upon changing the characteristic of the active speed range to provide a visual indication of the changed characteristic of the active speed range.

According to another aspect the invention, the changed characteristic of the active speed range corresponds to an updated range maximum speed based on at least one of selecting a different speed range through the operator control interface system and changing a value of the active speed range through the operator control interface system. The display may include a speedometer gauge with a dynamic scale configured to change visually to provide a visual indication of the updated range maximum speed. The changing of the characteristic of the active speed range may include selecting a different speed range such that the updated range maximum speed corresponds to the range maximum speed of the different speed range. The changing of the characteristic of the active speed range may include changing a value of the range maximum speed of the active speed range such that the updated range maximum speed corresponds to a redefined range maximum speed of the active speed range.

According to another aspect of the invention, the speedometer gauge the include a dynamic scale with a first segment of the dynamic scale indicating a currently active speed range and a second segment of the dynamic scale indicating at least one inactive speed range. The first and second segments of the dynamic scale provide different visual appearances facilitating visually distinguishing between the inactive and active speed ranges. The speedometer gauge may include a range mark arranged between the currently active speed range and the inactive speed range(s), with the range mark displayed at a position indicating the range maximum speed of the currently active speed range. Other range marks may be displayed at positions indicating the range maximum speed of the inactive speed ranges.

According to another aspect the invention, the speed control and display system may include a joystick with speed/range control buttons configured for changing the range maximum speed of each of the speed ranges and for changing between the speed ranges. The speed/range control buttons may include a range selector button, an increase button, and a decrease button. When the range selector button of the joystick is pressed and held, pressing the increase button of the joystick changes the speed range of the hydrostatic transmission system to a higher speed range and pressing the decrease button of the joystick changes the speed range of the hydrostatic transmission system to the lower speed range. When the range selector button is not pressed and left released, pressing the increase in the joystick increases a value of the range maximum speed of the current range and pressing the decrease button the joystick decreases a value of the range maximum speed of the current range.

According to another aspect invention, the speedometer gauge may define an animated speedometer having a scale with a first segment corresponding to an active speed range and a second segment corresponding to an inactive speed range. Relative sizes of the first and second segments of the scale automatically change to reflect the changes to the range maximum speed of the active speed range or to reflect the changes to different speed ranges.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

Figure 1:
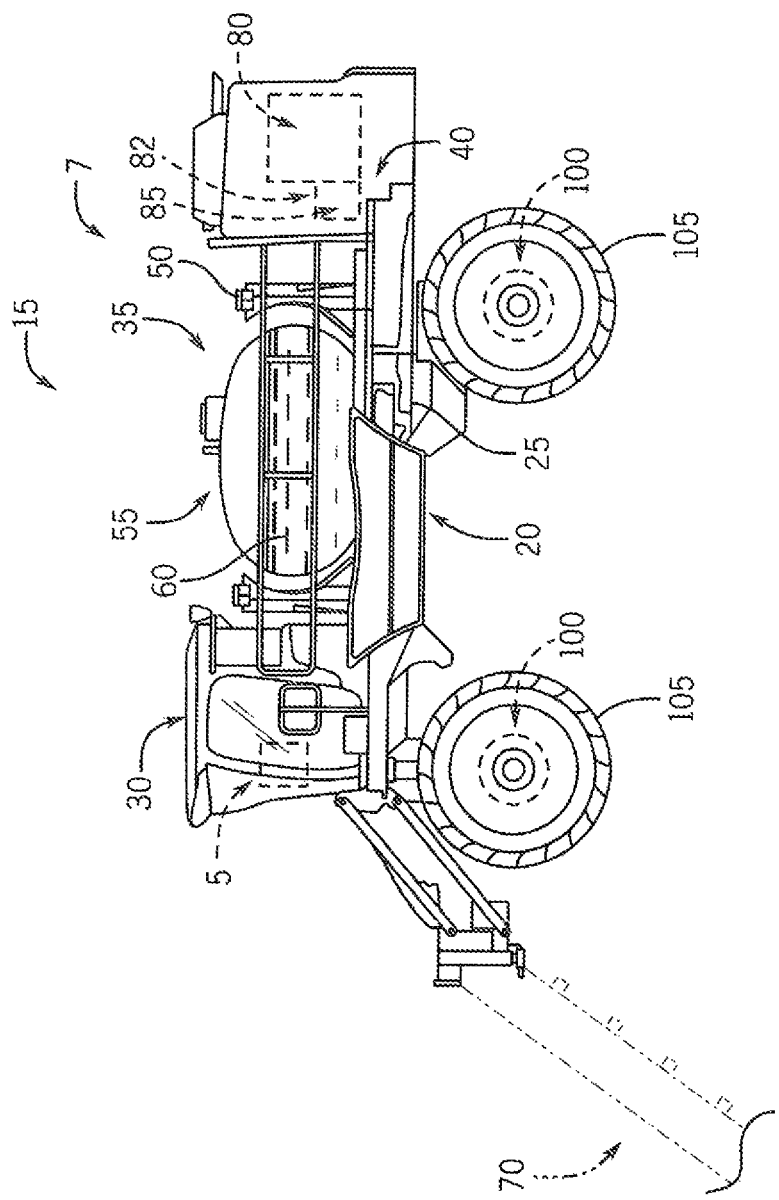
FIG. 1 is a side elevation view of self-propelled off-road agricultural vehicle with a dynamically reconfiguring speed control and display system according to the present invention.

Referring now to the drawings and specifically to FIG. 1, a speed control and display system 5 is provided that allows for selecting and (re)defining speed ranges of a variable speed such as an infinitely variable power transmitting drivetrain system in multiple ways and while on-the-go as well as dynamically presenting speed-related information to an operator, including presenting animated reconfiguring display information, explained in greater detail elsewhere herein. Speed control and display system 5 is shown for use with self-propelled off-road agricultural vehicle 7. The self-propelled off-road agricultural vehicle 7 may be an agricultural applicator that deposits, for example, liquid, as well as, dry and gaseous product. above and below ground, pre-emerge and post-emergence or sprouting of the crop, which includes operations such as seeding, inter-seeding, fertilizing, and application of, for example, herbicides, fungicides, and insecticides as well as soil conditioners, growth retardants, and other agents, such as by way of various toolbar attachments, planters, anhydrous ammonia applicators, and others. The self-propelled off-road agricultural vehicle may be an applicator-type vehicle and is shown here as a self-propelled sprayer 15. Sprayer 15 is shown as a front-mounted boom self-propelled sprayer such as those available from CNH Industrial, including the Miller Nitro and the New Holland Guardian Series front-mounted boom sprayers. Although sprayer 15 is shown as a front-mounted boom self-propelled sprayer, it is understood that self-propelled versions of sprayer 15 can have either front-mounted, mid-mount, or rear-mounted booms, as well as boom-less sprayers, tiered booms, and detachable sprayers. It is further understood that off-road agricultural vehicle 7 may include other self-propelled implements, tractors, or other off-road agricultural vehicles 7.

Still referring to FIG. 1, sprayer 15 includes chassis 20 having chassis frame 25 that supports various assemblies, systems, and components. These various assemblies, systems, and components include cab 30, an application system shown as spray system 35, and a drivetrain system 40. Spray system 35 includes storage containers such as rinse tank 50 storing water or a rinsing solution and product tank 55 that stores as volume of product 60 for delivery onto an agricultural field with sprayer 15. Product 60 includes any of a variety of agricultural liquid products, such as various pesticides, herbicides, fungicides, liquid fertilizers, and other liquids including liquid suspensions beneficial for application onto agricultural fields. A product delivery pump conveys product 60 from product tank 55 through plumbing components such as interconnected pieces of tubing and through a foldable and height-adjustable boom of a boom system 70 for release out of spray nozzles that are spaced from each another along the width of a boom during spraying operations of applicator 15.

Still referring to FIG. 1, the drivetrain system 40 includes engine 80 and transmission 82 that receives power from engine 35 and which may be configured to transmit power for propelling sprayer 15 in an infinitely variable power transmitting manner. Transmission 82 can be a hydrostatic transmission with a hydrostatic pump system 85, which may have a tandem pair of variable displacement hydrostatic pumps. Wheel drives 100 are supported at bottom ends of legs that extend from swing arms that are pivot mounted to chassis frame 25. Each wheel drive 100 may include a planetary gear set and a hydraulic motor as a wheel motor which may be a variable displacement wheel motor that is operably connected to hydrostatic pump system 85. For wheel drives 100 that include planetary gear sets, the wheel motors may be configured to directly drive the planetary gear set to establish a direct drive relationship between each wheel drive 100 and its respective wheel 105 of the sprayer 15. It is understood that transmission 82 may be implemented as other types of infinitely variable power transmissions, including CVT's (continuously variable transmissions) and variable speed belt drives.

Figure 2:
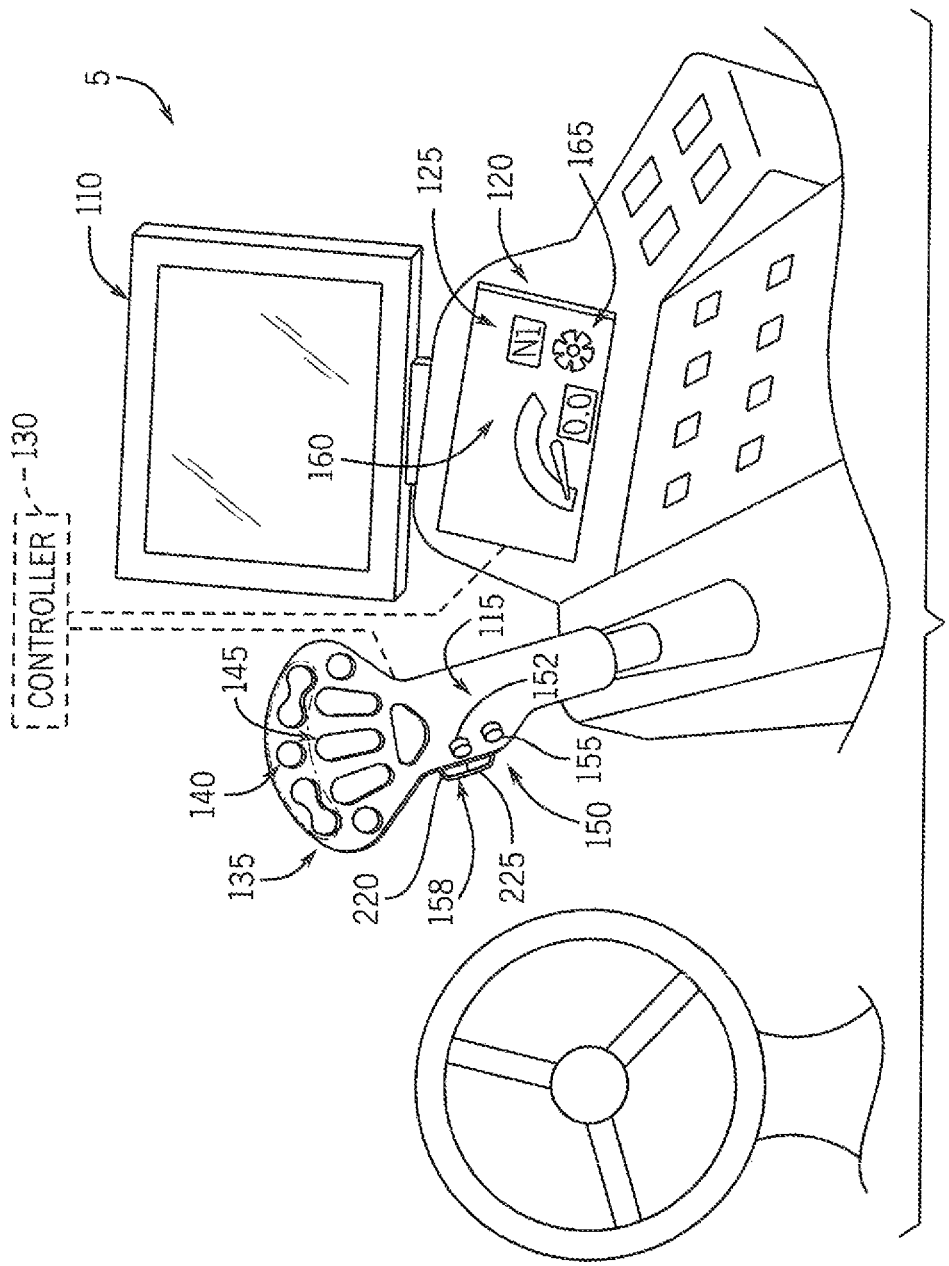
FIG. 2 is a simplified partially schematic pictorial view of an interior of a cab with a dynamically reconfiguring speed control and display system according to the present invention.

Referring now to FIG. 2, speed control and display system 5 has multiple operator control interfaces that allow for operator control of the systems and components of sprayer 15. The operator control interfaces may include a VT (virtual terminal) or field computer 110, joystick 115, and monitor 120 with a touchscreen 125 as an HMI. Although shown as a single HMI, it is understood that multiple HMIs may be implemented such as an in-cab HMI and another at a load station, or a portable HMI via an electronic tablet application program or dedicated HHD (hand held device) either wireless or tethered to speed control and display system 5.

Still referring to FIG. 2, speed control and display system 5 includes at least one electronic controller 130 that is configured to control operations of the drivetrain system 40, including travel speed and travel direction. Electronic controller 130 includes a microprocessor and may be implemented as a programmable logic controller (PLC) or other industrial computer, along with corresponding software and suitable memory for storing such software and hardware including interconnecting conductors for power and signal transmission and communication for controlling electronic, electro-mechanical, and hydraulic components of the drivetrain system 40. Communication may be done through direct interconnection such as directly routed wiring harnesses or through one or more serial bus systems such as a CAN (controller area network) bus(es) between the electronic controller 130 and the sensors, actuators, and/or other components of sprayer 15 for monitoring and controlling the corresponding systems and components of the drivetrain system 40 to control direction, speed, and braking of sprayer 15.

Still referring to FIG. 2, joystick 115 includes grip 135 with various grip buttons 140 for controlling various corresponding functions of sprayer 15 including boom control buttons 145 that control operations of boom system 70 such as boom height and tilt and spray delivery patterns, as well as speed/range control buttons 150 controlling movement characteristics of the sprayer 15 such as and speed and ranges.

Speed/range control buttons 150 are shown as low/high speed setting button 152 that can be toggled to configure operation of the drivetrain system 40 to perform with low speed creeper-type performance or with high speed-type performance. A range selector includes range selector button 155 that can be pressed and held along with actuating segments or pads of a trigger button 158 to select different speed ranges of the drivetrain system 40. Trigger button 150 is configured to adjust values of the speed ranges themselves when the range selector button 155 is not pressed and thus is left released. Moving the joystick 115 forward and/or backward with respect to a neutral gate controls direction and speed of travel of sprayer 15 with varying the position of joystick 115 by moving the joystick 115 away from the neutral gate correspondingly varying speed of sprayer 15. Movement of joystick 115 to a fully forward or fully backward position provides a full speed command to the drivetrain system 40 to propel the sprayer 15 at a corresponding maximum travel speed for a particular speed range that is selected by the operator.

Still referring to FIG. 2, speed control and display system 5 is configured to allow an operator to set the speed ranges in multiple ways. One of the ways to set the speed ranges is to establish and/or redefine predetermined speed ranges through a transmission range setup operation using touchscreen 125 to navigate through screens or pages to arrive at a range setup page displayed on the touchscreen 125. This may be done by touching a navigation icon on a home screen page 160 displayed on touchscreen 125, and then from a list screen touching a transmission icon 165 or, more directly, by touching the transmission icon 165, shown on the right side of the home screen page 160.

Figure 3:
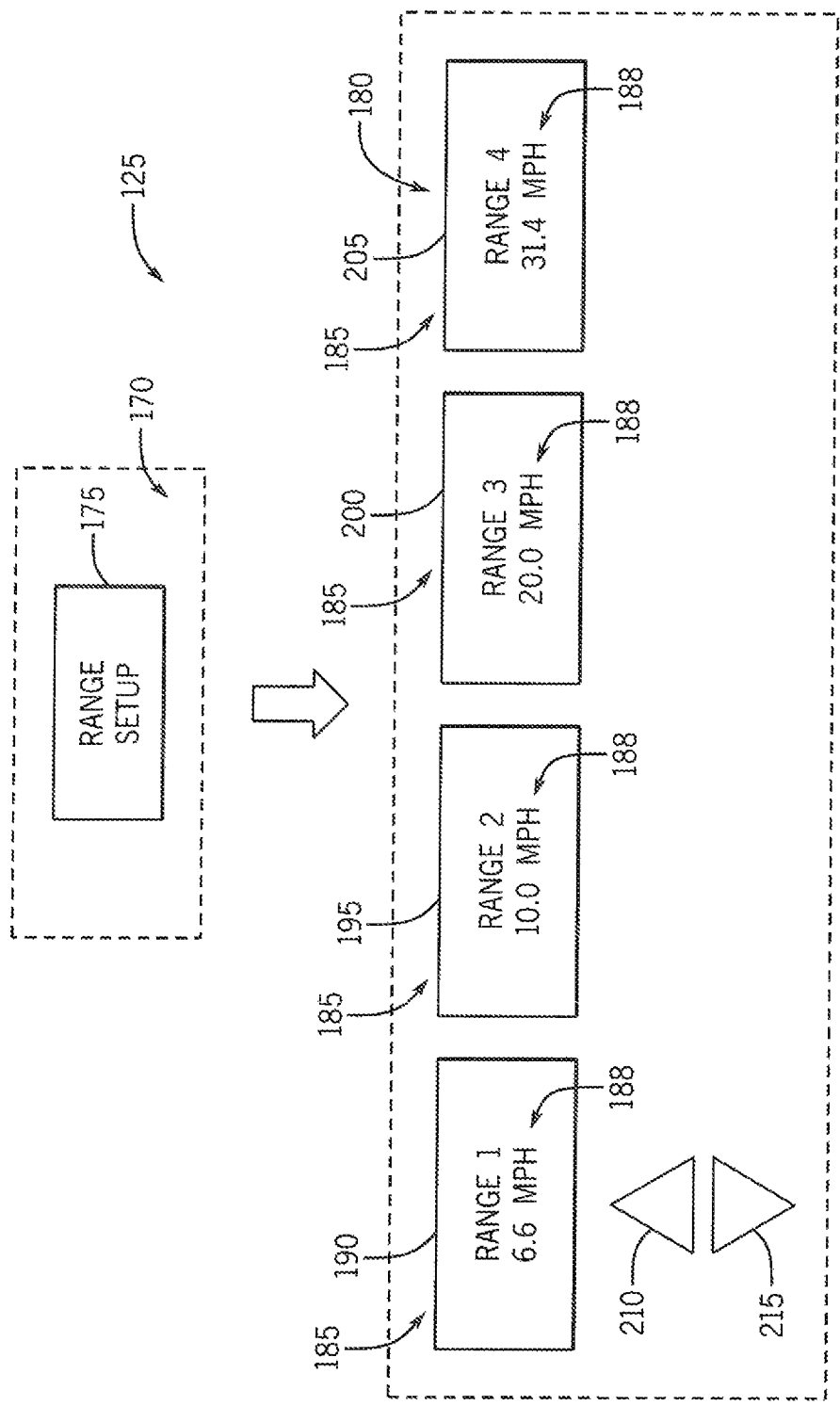
FIG. 3 is a simplified screenshot of a touchscreen of the dynamically reconfiguring speed control and display system of FIG. 2.

Referring now to FIG. 3, touching the transmission icon 165 (FIG. 2) displays a transmission screen page 170 with a range setup icon 175. Pressing the range setup icon 175 displays a range setup page 180. At the range setup page 180, range icons 185 display current upper limit value or range maximum speed 188 for the respective range. Range icons 185 include Range-1 icon 190, Range-2 icon 195, Range-3 icon 200, and Range-4 icon 205. Pressing one of the Range-1, Range-2, Range-3, and Range-4 icons 190, 195, 200, 205 presents a pair of adjustment arrow icons, shown as increase icon 210 and decrease icon 215 under the respective selected one of the Range-1, Range-2, Range-3, and Range-4 icons 190, 195, 200, 205 for making adjustments to the corresponding range maximum speed 188. For example, the up/down arrows of increase and decrease icons 210, 215 may change the value of the range maximum speed 188 by a predetermined value, such as 0.2 mph. Once the range maximum speed 188 is set in a specified range, simply going to that range with the joystick 115 will take you up to that range maximum speed 188. Within each ranges the speed, such as the range maximum speed 188, can be adjusted through the range setup page 180 on touchscreen 125 or speed/range control buttons 150 on joystick 115.

Figure 4:
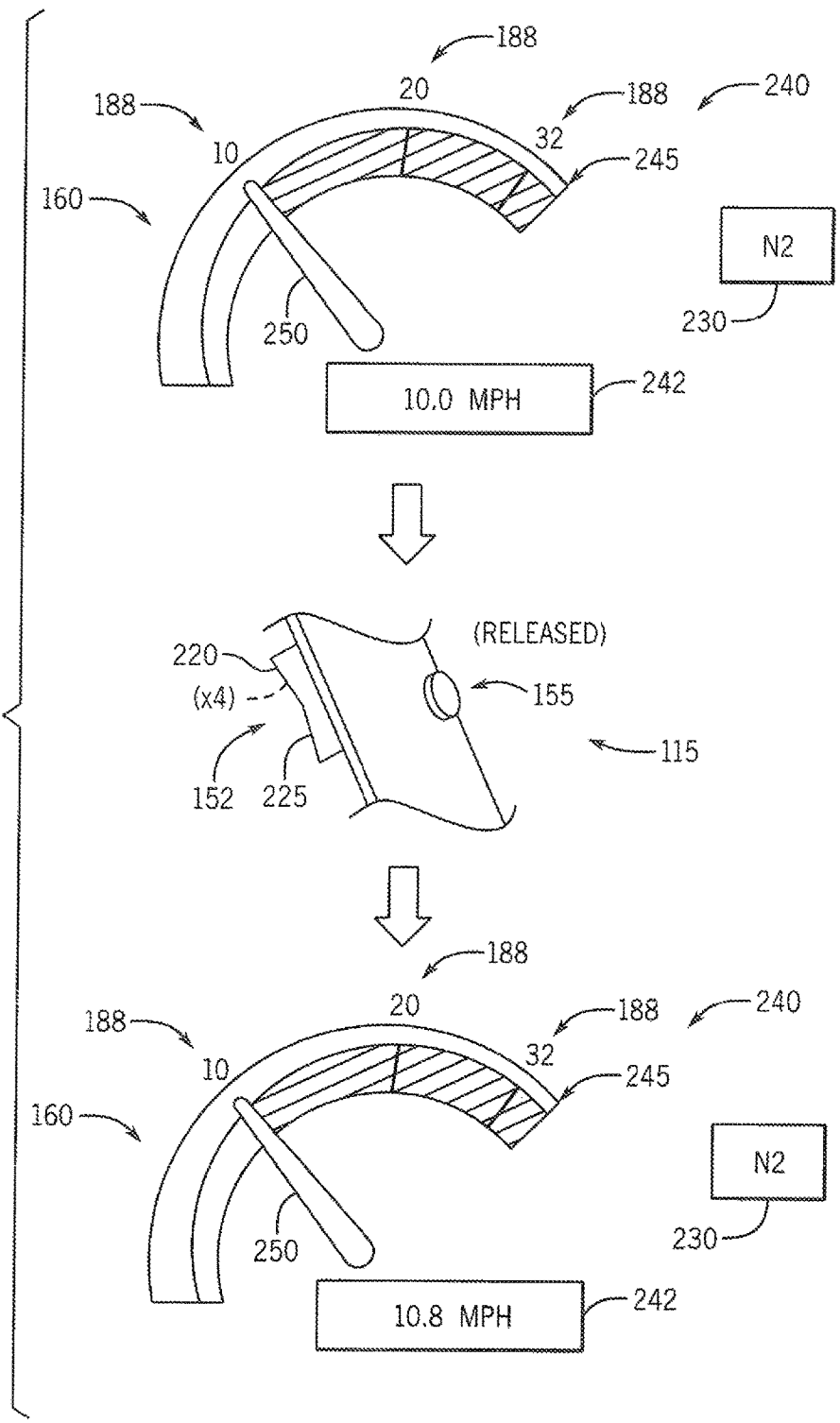
FIG. 4 is a simplified view of portions of a screenshot of touchscreen and portions of the dynamically reconfiguring speed control and display system of FIGS. 2.

Referring now to FIGS. 2 and 4, on-the-go during operation of sprayer 15, trigger button 150 can be used to adjust or redefine the range maximum speed 188 for the currently-used speed range. Trigger button 150 has upper and lower segments or pads that define a trigger increase button 220 and a trigger decrease button 225. When the range selector button 155 is not pressed and is left in its released state, trigger increase and decrease buttons 220, 225 are configured to allow inputting change commands for the value of the range maximum speed 188. In each of the speed ranges, the range maximum speed 188 can be increased or decreased by pressing and holding the trigger increase or decrease buttons 220, 225 to continuously and gradually increase or decrease the range maximum speed 188 until the desired redefined range maximum speed of 188 is achieved. For fine adjustments of the range maximum speed 188, the trigger increase or decrease buttons 220, 225 can be discreetly clicked or pressed, with each press of the increase or decrease buttons 220, 225 changing the value of the range maximum speed 188 by a predetermined value, such as 0.2 mph.

Referring now to FIG. 4, home screen page 160 displays a current range icon 230, which shows that the transmission system 40 is in Range-2. Home screen page 160 also displays speedometer gauge 240 with an animated speedometer with a numerical readout 242 and with an animated dynamic scale 245 that automatically reconfigures to reflect changes in the range characteristics. Those characteristics include swept distance along which needle 250 can move until reaching the range maximum speed 188 at which point the electronic controller 130 limits travel speed of the sprayer 15, as well as changing color to show the current available swept range. For example, the range maximum speed 188 and the swept continuous values below the range maximum speed 188 of the active range(s) may be one color such as white that clearly contrasts with another color of the remainder of the dynamic scale 245. This presents the active speed range(s) in a visually conspicuous matter that is readily distinguishable from the inactive speed range(s) so as to provide a ratio representation of active and inactive ranges and/or speeds. Range marks 255 visually show the range maximum speed 188 for the corresponding speed range, for example, by a mark-line and corresponding numerical label for the mark-line.

Still referring now to FIG. 4, a change of value of the range maximum speed 188 for the current range is shown in a simplified schematic representation of a portion of the home screen page 160. This example shows a fine adjustment-type change of the range maximum speed 188 for Range-2, as indicated by current range icon 230. The speedometer 240 at the top of FIG. 1 shows that the sprayer 15 is traveling at the maximum speed for Range-2, with needle 250 against the range mark 255 for Range-2 and thus at the end or at a fully swept position of the active range. This corresponds to the joystick 115 being moved fully forward to the full speed position long enough for sprayer 15 to achieve a travel speed of the range maximum speed 118 of Range-2. As represented by the portion of joystick 115 shown toward the middle of FIG. 4, to adjust the upper limit for range maximum speed 188 of Range-2 trigger increase button 220 can be discreetly pressed four times without pressing the range selector button 155. Each press of the trigger increase button 220 increasing the range maximum speed 188 by 0.2 mph.

As result, the range maximum speed 188 is increased by 0.8 mph. Upon this change, the animated speedometer 240 automatically changes its display to move the range mark 255 and its updated numerical label of 10.8 mph farther up the dynamic scale 245. This increases the length of the active segment of the dynamic scale 245 that can be swept by needle 250 to show available travel speeds with the updated range maximum speed 188. Thus, when the range maximum speed 188 is changed by increasing its value, relatively more of the dynamic scale 245 is shown in the first color. The range maximum speed 188 can be decreased generally the opposite way. Thus by holding the joystick 115 in the fully forward position and pressing and holding or sequentially discreetly pressing the trigger decrease button 225, the value of the range maximum speed 188 for the current range is changed to a lower value, along with corresponding visual changes of the animated speedometer 240 with relatively less of the dynamic scale 245 being shown in the first color at the active segment of the dynamic scale 245.

Figure 5:
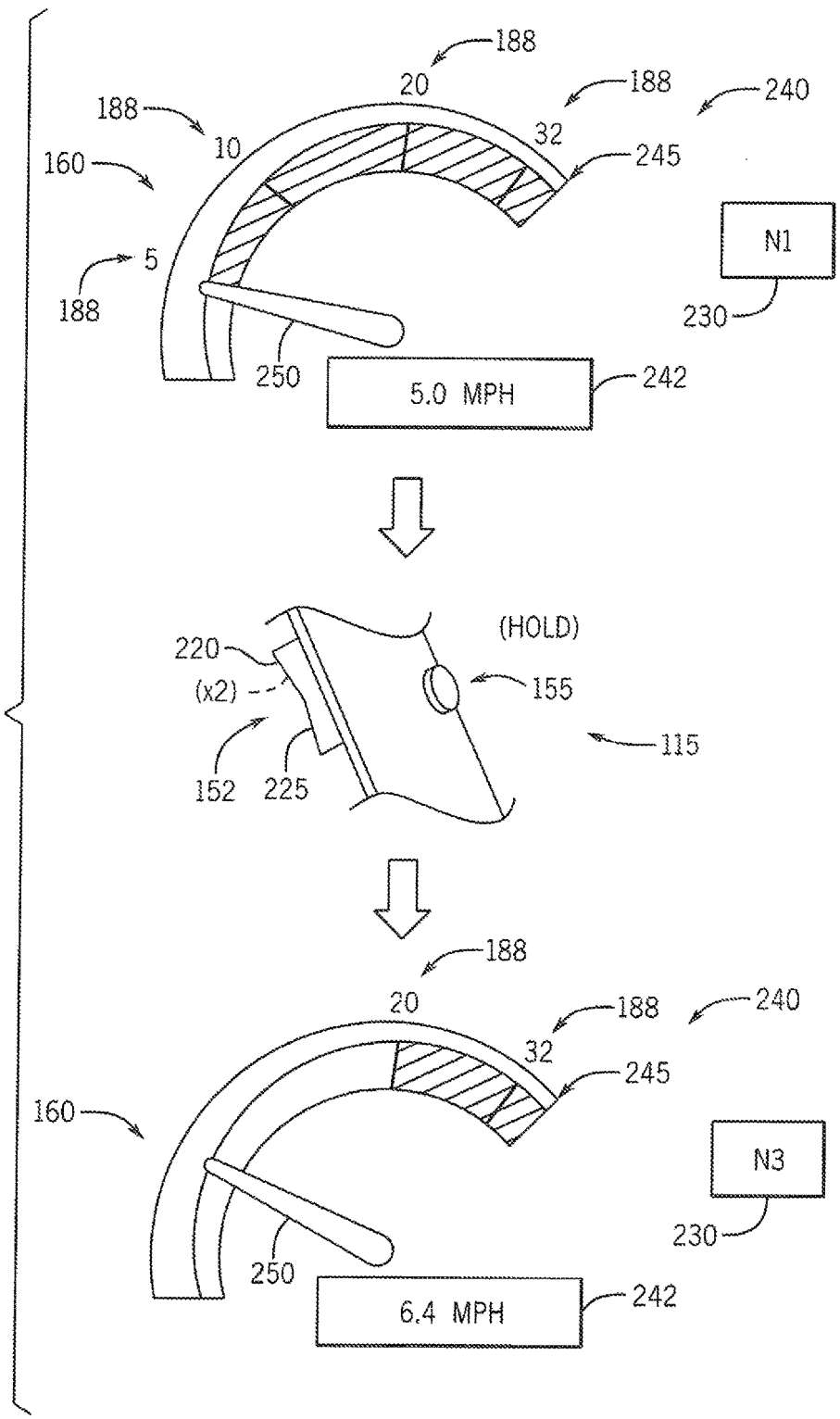
FIG. 5 is another simplified view of portions of a screenshot of touchscreen and portions of the dynamically reconfiguring speed control and display system of FIG. 2.

Referring now to FIG. 5, large-scale changes of available travel speed(s) can be achieved by changing to a different speed range through the joystick 115. This example shows a larger scale change of available travel speed(s) by changing from Range-1, as indicated by current range icon 230 toward the top of FIG. 5, to Range-3, as indicated by current range icon 230 toward the bottom of FIG. 5. This can be done by pressing and holding the range selector button 155 and simultaneously pressing trigger increase button 220 two times, to make two-step changes from Range-1 to Range-2 and from Range-2 to Range-3. Upon commanding this range change, the animated speedometer 240 automatically changes its display to hide the range marks 255, including hiding the corresponding numerical labels for Range-1 and Range-2. This increases the length of the dynamic scale 245 that can be swept by needle 250 and thus the amount of the dynamic scale 245 that is the first color, such as white, to indicate the new available range limit, with range maximum speed 188 for current Range-3 setting the updated limit on travel speed of the sprayer 15. The position of needle 251) and the value displayed at numerical readout 242 toward the bottom of FIG. 5 show that, relative to the previous speed in Range-1 toward the top of FIG. 5, sprayer 15 is traveling faster with more available speed. Correspondingly, changing to a higher speed range provides a lower resolution of speed control for the movement available for the joystick 115.

Many changes and modifications could be made to the invention without departing from the spirit thereof. The scope of these changes will become apparent from the appended claims.

We claim:

1. A self-propelled off-road agricultural vehicle with a dynamically reconfiguring speed control and display system, the self-propelled off-road agricultural vehicle comprising:
   a chassis having wheels for moving the off-road self-propelled agricultural vehicle and planetary gear sets arranged for rotating the wheels;
   a drivetrain system variably delivering power to the wheels for varying speed of the self-propelled off-road agricultural vehicle; and
   a speed control and display system for controlling the drivetrain system to provide multiple speed ranges and corresponding different speed control resolutions, wherein each of the speed ranges defines a range maximum speed corresponding to a maximum travel speed of the self-propelled off-road agricultural vehicle for the respective speed range when the respective speed range defines an active speed range, the speed control and display system displaying corresponding speed information for viewing by an operator and including,
      an operator control interface system configured for changing a characteristic of the active speed range to define an updated speed range;
      a display configured to change visually upon changing the characteristic of the active speed range to provide a visual indication of the changed characteristic of the active speed range.

2. The self-propelled off-road agricultural vehicle of claim 1 wherein the drivetrain system includes a hydrostatic transmission and wherein the changed characteristic of the active speed range corresponds to an updated range maximum speed based on at least one of selecting a different speed range through the operator control interface system and changing a value of the active speed range through the operator control interface system, and wherein the display comprises a speedometer gauge with a dynamic scale configured to change visually to provide a visual indication of the updated range maximum speed.

3. The self-propelled off-road agricultural vehicle of claim 2 wherein the changing of the characteristic of the active speed range includes selecting a different speed range such that the updated range maximum speed corresponds to the range maximum speed of the different speed range.

4. The self-propelled off-road agricultural vehicle of claim 2 wherein the changing of the characteristic of the active speed range includes changing a value of the range maximum speed of the active speed range such that the updated range maximum speed corresponds to a redefined range maximum speed of the active speed range.

5. The self-propelled off-road agricultural vehicle of claim 2 wherein the speedometer gauge comprises a dynamic scale with a first segment of the dynamic scale indicating a currently active speed range and a second segment of the dynamic scale indicating at least one inactive speed range and wherein the first and second segments of the dynamic scale provide different visual appearances facilitating visually distinguishing between the inactive and active speed ranges.

6. The self-propelled off-road agricultural vehicle of claim 5 wherein the speedometer gauge comprises a range mark arranged between a currently active speed range and the at least one inactive speed range, wherein the range mark corresponds in position to a position indicating the range maximum speed of the currently active speed range.

7. The self-propelled off-road agricultural vehicle of claim 6 wherein the range mark defines an active range mark and the speedometer gauge includes inactive range marks corresponding in position to positions indicating the range maximum speeds of the inactive speed ranges.

8. The self-propelled off-road agricultural vehicle of claim 2 wherein the speed control and display system comprises a joystick with speed/range control buttons configured for changing the range maximum speed of each of the speed ranges and for changing between the speed ranges.

9. The self-propelled off-road agricultural vehicle of claim 8 wherein the speedometer gauge defines an animated speedometer having a scale defining a first segment corresponding to an active speed range and a second segment corresponding to an inactive speed range and wherein the relative sizes of the first and second segments of the scale change to reflect the changing of the range maximum speed of the active speed range.

10. The self-propelled off-road agricultural vehicle of claim 8 wherein the speedometer gauge defines an animated speedometer having a scale defining a first segment corresponding to an active speed range and a second segment corresponding to an inactive speed range and wherein the relative sizes of the first and second segments of the scale change to reflect the changing to different speed ranges.

11. The self-propelled off-road agricultural vehicle of claim 2 wherein the speed control and display system comprises a joystick with a range selector button, an increase button, and a decrease button, and wherein
when the range selector button of the joystick is pressed and held, pressing the increase button of the joystick changes the speed range of the hydrostatic transmission system to a higher speed range and pressing the decrease button of the joystick changes the speed range of the hydrostatic transmission system to the lower speed range; and
when the range selector button is not pressed and left released, pressing the increase in the joystick increases a value of the range maximum speed of the current range and pressing the decrease button the joystick decreases a value of the range maximum speed of the current range.

12. A method for controlling a self-propelled off-road agricultural vehicle with a dynamically reconfiguring speed control and display system, the self-propelled off-road agricultural vehicle including a chassis having wheels for moving the off-road self-propelled agricultural vehicle, planetary gear sets arranged for rotating the wheels and a drivetrain system variably delivering power to the wheels for varying speed of the self-propelled off-road agricultural vehicle, the method comprising:
controlling the drivetrain system to provide multiple speed ranges and corresponding different speed control resolutions, wherein each of the speed ranges defines a range maximum speed corresponding to a maximum travel speed of the self-propelled off-road agricultural vehicle for the respective speed range when the respective speed range defines an active speed range, and
displaying corresponding speed information for viewing by an operator, the speed information including,
an operator control interface system for changing a characteristic of the active speed range to define an updated speed range;
a display changing visually upon changing the characteristic of the active speed range for providing a visual indication of the changed characteristic of the active speed range.

13. The method of claim 12 wherein the drivetrain system includes a hydrostatic transmission and wherein the changed characteristic of the active speed range corresponds to an updated range maximum speed based on at least one of selecting a different speed range through the operator control interface system and changing a value of the active speed range through the operator control interface system, and wherein the displaying further comprises displaying a speedometer gauge with a dynamic scale configured to change visually to provide a visual indication of the updated range maximum speed.

14. The method of claim 13 wherein the changing of the characteristic of the active speed range includes selecting a different speed range such that the updated range maximum speed corresponds to the range maximum speed of the different speed range.

15. The method of claim 13 wherein the changing of the characteristic of the active speed range includes changing a value of the range maximum speed of the active speed range such that the updated range maximum speed corresponds to a redefined range maximum speed of the active speed range.

16. The method of claim 13 further comprising displaying the speedometer gauge with a dynamic scale with a first segment of the dynamic scale indicating a currently active speed range and a second segment of the dynamic scale indicating at least one inactive speed range and wherein the first and second segments of the dynamic scale provide different visual appearances facilitating visually distinguishing between the inactive and active speed ranges.

17. The method of claim 16 further comprising displaying the speedometer gauge with a range mark arranged between a currently active speed range and the at least one inactive speed range, wherein the range mark corresponds in position to a position indicating the range maximum speed of the currently active speed range.

18. The method of claim 17 wherein the range mark defines an active range mark and the speedometer gauge includes inactive range marks corresponding in position to positions indicating the range maximum speeds of the inactive speed ranges.

19. The method of claim 13 further comprising providing a joystick with speed/range control buttons configured for changing the range maximum speed of each of the speed ranges and for changing between the speed ranges.

20. The method of claim 19 further comprising providing with respect to the speedometer gauge an animated speedometer having a scale defining a first segment corresponding to an active speed range and a second segment corresponding to an inactive speed range and wherein the relative sizes of the first and second segments of the scale change to reflect the changing of the range maximum speed of the active speed range.

* * * * *